Patented Sept. 23, 1947

2,427,821

UNITED STATES PATENT OFFICE 2,427,821

HIGHER ESTERS OF CHLORO NITRO ALCOHOLS

John B. Tindall, Terre Haute, Ind., assignor to Commercial Solvents Corporation, Terre Haute, Ind., a corporation of Maryland No Drawing. Application January 22, 1944,
Serial No. 519,341

6 Claims. (Cl. 260—404)

This invention relates to higher esters of chloro nitro alcohols, and more particularly to such esters having the following structural formula:

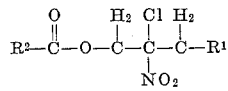

in which $R^1$ represents hydrogen or alkyl, and in which $R^2$ represents alkyl, monochloroalkyl or dichloralkyl radicals having in excess of 10 carbon atoms.

An object of the invention is to provide new compositions of matter comprising the higher alkyl esters, the chloroalkyl esters, and the dichloralkyl esters of the chloro nitro alcohols represented.

A further object is to provide useful lubricating compositions designed to withstand so-called "extreme" pressures, containing the higher esters described.

A still further object is to provide a process for preparing the higher esters of the chloro nitro alcohols described.

Other objects will be apparent from the specification and claims.

Among the esters of chloro nitro alcohols included in my invention are the lauric, myristic, palmitic, stearic, arachidic, behenic, oleic, etc., esters and their mono and dichloro derivatives, of such alcohols as 2-chloro-2-nitro-1-propanol, 2-chloro-2-nitro-1-butanol, 2-chloro-2-nitro-1-pentanol, 2-chloro-2-nitro-1-hexanol, 2-chloro-2-nitro-1-heptanol, 2-chloro-2-nitro-1-octanol, and the like. The esters of my invention are esters of primary alcohols, and all carry both a chlorine and a nitro group on the alpha, or 2 carbon atom.

These esters are prepared by mixing the 2-chloro-2-nitro-1-alkanol of the character described with the appropriate higher fatty acid in an inert solvent such as benzene, toluene, xylene or the like with a small proportion of an esterification catalyst such as concentrated sulfuric acid. The mixture is subjected to distillation through a column fitted with a separator which returns the inert solvent such as benzene to the distillation vessel, and permits removal of the water. The reaction is complete at this point and the resulting product is treated with a small predetermined quantity of a base such as potassium hydroxide in methanol to neutralize the free acid remaining, and a solvent such as butanol is added to reduce emulsification of the resulting soap. The mixture is washed with water to remove soap and similar water soluble impurities and the added solvents are removed by distillation. If the esterified mixture is dark, it may be refluxed with a decolorizing aid such as Nuchar, an activated carbon, or Filtrol, an earthy type material.

The preparation of the compounds described may be further illustrated by the following specific examples.

EXAMPLE I

2-chloro-2-nitrobutyl stearate

Seventy-seven parts (0.5 mole) of 2-chloro-2-nitro-1-butanol, 142 parts (0.5 mole) of 97% stearic acid, 300 parts by volume of benzene and 2 parts of concentrated sulfuric acid are mixed and distilled through a packed column fitted with a separator. Benzene is returned to the column and water is removed until 9.8 parts of water are obtained and no more water is being formed. The reaction time is about 13 hours. The reaction mixture is somewhat discolored and is refluxed for about an hour with 5 parts of activated carbon and 5 parts of Filtrol. After filtration the treated material is light in color. To recover the ester, 275 parts of 1-butanol and 3.5 parts of normal potassium hydroxide in 7.5 parts of methanol are added to neutralize the acid esterification catalyst, and any unreacted organic acid that may remain, and the solution is mixed thoroughly. It is then washed with several 350 part portions of water. The solvents are removed by heating to 100° C. at 5 mm. pressure. The product, 2-chloro-2-nitrobutyl stearate, has a light straw color, and is obtained in a yield of 83%.

EXAMPLE II

2-chloro-2-nitrobutyl oleate

One hundred fifty-three and a half parts of 2-chloro-2-nitro-1-butanol and 282 parts of oleic acid are mixed in 500 parts by volume of benzene, to which 5 parts of concentrated para-toluenesulfonic acid are added. The mixture is refluxed for 30 hours through a packed column fitted with a separater. The benzene is returned to the column and water is removed until 15 parts are obtained and no more water is formed. The reaction mixture is black in color and accordingly is refluxed for 3 hours in the presence of 5 parts of activated carbon and 5 parts of an earthy filter aid. The decolorization is repeated twice and results in a light orange product. To this product are added 400 parts of butanol and 40 parts of 2.48 N potassium hydroxide in methanol, the latter to neutralize the acid catalyst. The mixture is then washed twice with 400 part portions of water and upon separation of the water, the product is distilled to 105° C. liquid temperature at 2 mm. pressure. Three hundred one and two-tenths parts of 2-chloro-2-nitrobutyl oleate are produced which are equivalent to a yield of 75%.

EXAMPLE III

2-chloro-2-nitrobutyl dichlorostearate

One hundred fifty-three and three-tenths parts (1 mole) of 2-chloro-2-nitro-1-butanol are mixed with 355 parts (1 mole) of dichlorostearic acid in 600 parts by volume of benzene, to which 4 parts of concentrated sulfuric acid has been added. The mixture is refluxed under the conditions described in the previous experiments for six hours with return of benzene to the column and removal of water until 16 parts of water are removed and no more water is formed. The reaction mixture is decolorized by refluxing treatment with 20 parts of activated carbon and 20 parts Filtrol for about 3 hours. The decolorization is twice repeated, resulting in a dark yellow liquid. To the product are added 300 parts of 1-butanol and 30 parts of 3.35 N KOH in methanol to neutralize the acid. The mixture is then washed with water until the wash water contains no soap and the product is then distilled to 100° C. liquid temperature at 2 mm. pressure to remove the added solvents. The amber-colored residue, which is the 2-chloro-2-nitrobutyl dichlorostearate, is present to the extent of about 306 parts, that is, a 78% yield.

EXAMPLE IV

2-chloro-2-nitropropyl oleate

Seventy parts (about .5 mole) of 2-chloro-2-nitropropyl alcohol and 141 parts (.5 mole) oleic acid are mixed with 350 parts benzene containing 2 parts of concentrated sulfuric acid. The mixture is reacted as described for 7 hours until 8 parts of water are obtained and no more water is formed. The product is decolorized with 10 parts of activated carbon and 5 parts of Filtrol, refluxed for 3 hours and the decolorization repeated. Then 200 parts of 1-butanol and 25 parts of 3.45 N KOH in methanol are added to the light amber product. This then washed several times with water and distilled at 2 mm. to 100° C. resulting in 119 parts of 2-chloro-2-nitropropyl oleate in a yield of 62%.

EXAMPLE V

2-chloro-2-nitropropyl dichlorostearate

Seventy parts of 2-chloro-2-nitro-1-propyl alcohol and 177.5 parts of dichlorostearic acid are mixed in 350 parts of benzene containing 2 parts of concentrated sulfuric acid. The mixture is refluxed as described for 5 hours resulting in the formation of 7 parts of water which are removed. The product is decolorized twice, using 10 parts of activated carbon and 5 parts of Filtrol in each decolorization. Then 200 parts of 1-butanol and 14 parts of 3.4 N KOH in methanol are added and the mixture washed with several 300 part portions of water until free from soap. This mixture is distilled at 100° C. and 2 mm. pressure, resulting in 164 parts of 2-chloro-2-nitropropyl dichlorostearate, a yield of 69%.

EXAMPLE VI

2-chloro-2-nitropropyl stearate

Seventy parts of 2-chloro-2-nitro-1-propanol and 142 parts of 97% stearic acid are mixed in 300 parts of benzene containing 2 parts of concentrated sulfuric acid. The mixture is reacted 10 hours as described in the previous examples, during which time 8.5 parts of water are formed. The product is decolorized by reflux treatment with 10 parts of activated carbon and 5 parts of Filtrol with which it is refluxed for 4 hours and produces a clear light yellow color. Then 300 parts of 1-butanol and 16 parts of 2.48 N KOH in methanol are added and this mixture washed 3 times with 300 part portions of water. The mixture is distilled at 115° C. at 5 mm. pressure, resulting in 160.4 parts of 2-chloro-2-nitropropyl stearate in a yield of 79%.

Some of the properties of the esters described in the foregoing examples are given in Table I below:

TABLE I

Properties of esters

| Compound | Chlorine | | Sp. gr. 20°/20° | Refractive index $n_D^{20}$ | Melting point | Acidity | Color |
|---|---|---|---|---|---|---|---|
| | Found | Theor. | | | | | |
| | Per cent | Per cent | | | | Per cent | |
| 2-Chloro-2-nitropropyl oleate | 8.01 | 8.78 | 0.9958 | 1.4635 | Liquid | 2.04 | Amber. |
| 2-Chloro-2-nitropropyl dichlorostearate | 19.86 | 22.3 | 1.0889 | 1.4721 | ...do.... | 4.85 | Amber. |
| 2-Chloro-2-nitro-1-butyl stearate from 97% stearic acid | 8.56 | 8.47 | | | 39.5° C | 0.66 | Light straw. |
| 2-Chloro-2-nitro-1-butyl oleate | 8.64 | 8.50 | 1.0064 | 1.4631 | Liquid | 1.66 | Light amber. |
| 2-Chloro-2-nitro-1-butyl dichlorostearate | 19.59 | 21.7 | 1.0814 | 1.4720 | ...do.... | 2.98 | Amber. |
| 2-Chloro-2-nitropropyl stearate | 8.55 | 8.82 | | | 44.5° C | 2.15 | Light yellow. |

The esters of my invention are liquids in some cases, and solids in others, but all are miscible with the various mineral and vegetable oils used in the preparation of lubricating compositions. Moreover, I have found that when these compounds are added to lubricating oils they impart a remarkably enhanced "oiliness" and increased load bearing capacity to the lubricant to which they are added.

It is known that many lubricants, especially the mineral oils, which are lubricating materials under moderate and low pressures, are entirely inadequate for carrying heavy loads at so-called extreme pressures, because at high pressures, lubrication apparently does not obey the ordinary hydrodynamic laws. At these higher pressures, the film properties of many of the common lubricants break down resulting in "seizure" of the moving parts and consequent failure of the mechanism.

To overcome this difficulty, attempts have been made to increase the load carrying capacities, particularly of the mineral oils, and oils so compounded are called "extreme pressure" lubricants, the term meaning (according to the SAE handbook for 1943, p. 491) that the load carrying capacity is substantially greater than that of mineral oil, without any distinction as to how much greater it may be. Attempts have been made, however, quantitatively to classify the various E. P. lubricants, and for this purpose the terms "powerful extreme pressure lubricants" and "mild" or "moderate extreme pressure lubricants" have come into use. Although no generally acceptable method of rating load carrying capacity has been developed to the point where it can be made the basis of an SAE (Society of Automotive Engineers) classification, a number of devices have been developed to evaluate this property among which is the Faville-LeValley extreme pressure lubricant tester described in U. S. Patent No. 2,110,288, assigned to the above co-partnership. This device is equipped to measure the load exerted on the film of lubricant and the torque developed under the load or pressure conditions used. Since the torque is a measure of the resistance to rotation of the lubricated part of the mechanism, the lower torque figure for any given load is representative of increased oiliness and ability to withstand heavy loads and extreme pressures.

The compositions of my invention when added to lubricating oils markedly increase the load bearing capacities of such oils.

Those esters in which no chlorine is present in the acyl portion of the molecule contribute great increases in load bearing capacity shown as reduced torque or resistance to movement as illustrated hereinafter and thus are useful in the preparation of the so-called "powerful" extreme pressure lubricants. Those which contain chlorine in the ester portion of the molecule, such as the mono and dichlorostearates, while imparting appreciable increase in load carrying capacity, can be subjected only to somewhat lesser increases in pressure, and are thus effective for use in the so-called "mild" or "moderate" extreme pressure lubricants.

When small portions of these esters are added to an SAE 30 oil base in the amounts indicated, and tested in the Faville-LeValley E. P. lubricant tester, described above, the representative results shown in Table II below are obtained.

TABLE II

| Compound | Oil Base | Per cent Comp. | Load, lbs. | Torque, lbs. | Temp., °F. |
|---|---|---|---|---|---|
| 2-chloro-2-nitrobutyl stearate | SAE 30 | 1.0 | 4,500 | 16.0 | 447 |
| 2-chloro-2-nitrobutyl oleate | SAE 30 | 1.0 | 4,500 | 16.0 | 335 |
| 2-chloro-2-nitrobutyl dichlorostearate | SAE 30 | 1.0 | 1,750 | 13.0 | 320 |
| None | SAE 30 | 0.0 | 1,250 | 12.0 | 178 |

From the above table it will be observed that a standard SAE 30 oil alone produces a torque of 12.0 under a load of 1250 pounds. Upon addition of only 1.0% of 2-chloro-2-nitrobutyl dichlorostearate a load increase up to 1750 pounds raises the torque to only 13.0. The more effective compounds, such as 2-chloro-2-nitrobutyl stearate and 2-chloro-2-nitrobutyl oleate under the high pressure of 4500 lbs. raise the torque only to 16. The effective amounts to be added to the base oil will vary somewhat, but I have found that quantities ranging between 0.1% and 10% based on the weight of the oil are effective.

While the above describes the preferred embodiments of my invention, it will be understood that departures may be made therefrom within the scope of the specification and claims.

What is claimed is:

1. As new compositions of matter, the higher esters of chloronitro alcohols having the following structural formula:

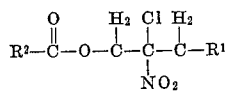

in which $R^1$ is selected from the group consisting of hydrogen and alkyl radicals, $R^2$ is selected from the group consisting of alkyl, alkenyl, mono chloroalkyl and dichloroalkyl radicals having in excess of 10 carbon atoms.

2. As new compositions of matter, the higher esters of chloronitroalcohols having the following structural formula:

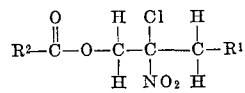

in which $R^1$ is a member selected from the group consisting of hydrogen and alkyl radicals and $R^2$ is an alkyl radical having in excess of 10 carbon atoms.

3. As a new composition of matter 2-chloro-2-nitrobutyl stearate.

4. As a new composition of matter 2-chloro-2-nitrobutyl oleate.

5. As a new composition of matter 2-chloro-2-nitrobutyl dichlorostearate.

6. A process for preparing higher esters of chloro nitro alcohols having the following structural formula:

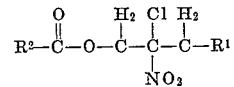

in which $R^1$ is selected from the group consisting of hydrogen and alkyl radicals and $R^2$ is selected from the group consisting of alkyl, alkenyl, monochloroalkyl and dichloroalkyl radicals having in excess of 10 carbon atoms which comprises reacting a chloronitro alcohol of the following structure:

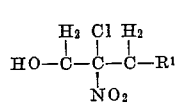

in which $R^1$ is selected from the group consisting of hydrogen and alkyl with an acid selected from the group consisting of alkyl, alkenyl, monochloroalkyl and dichloralkyl carboxylic acids having in excess of 10 carbon atoms.

JOHN B. TINDALL.

REFERENCES CITED

The following references are of record in the file of this patent:

UNITED STATES PATENTS

| Number | Name | Date |
|---|---|---|
| 2,340,268 | Hass | Jan. 25, 1944 |
| 2,321,578 | Clayton | June 15, 1943 |
| 2,270,113 | Clayton | Jan. 13, 1942 |